United States Patent [19]

Kobori et al.

[11] Patent Number: 5,311,709

[45] Date of Patent: May 17, 1994

[54] VARIABLE DAMPING DEVICE FOR SEISMIC RESPONSE CONTROLLED STRUCTURE

[75] Inventors: Takuji Kobori; Yoshinori Matsunaga; Naoki Niwa, all of Tokyo; Takayuki Mizuno, Chofu; Hironori Sasaki, Kobe; Ichiro Arimoto, Kobe; Naoshi Shinohara, Kobe, all of Japan

[73] Assignees: Kajima Corporation, Tokyo; Kawasakijukogyo Kabushiki Kaisha, Hyogo, both of Japan

[21] Appl. No.: 992,491

[22] Filed: Dec. 17, 1992

[30] Foreign Application Priority Data

Dec. 25, 1991 [JP] Japan ................................ 3-343499

[51] Int. Cl.⁵ .............................................. E04B 1/98
[52] U.S. Cl. ...................................... 52/167 DF; 52/1
[58] Field of Search .................... 52/167 R, 167 DF, 1

[56] References Cited

U.S. PATENT DOCUMENTS

| | | | |
|---|---|---|---|
| 4,799,339 | 1/1989 | Kobori et al. | 52/167 DF |
| 4,964,246 | 10/1990 | Kobori et al. | 52/167 R |
| 5,022,201 | 6/1991 | Kobori et al. | 52/167 DF |
| 5,036,633 | 8/1991 | Kobori et al. | 52/167 DF |
| 5,046,290 | 9/1991 | Ishit et al. | 52/167 DF |
| 5,065,552 | 11/1991 | Kobori et al. | 52/1 |
| 5,147,018 | 9/1992 | Kobori et al. | 88/300 |
| 5,233,797 | 8/1993 | Uno et al. | 52/167 DF |

FOREIGN PATENT DOCUMENTS

2-289769 11/1990 Japan .

*Primary Examiner*—Carl D. Friedman
*Assistant Examiner*—Kien Nguyen
*Attorney, Agent, or Firm*—James H. Tilberry

[57] ABSTRACT

A hydraulic variable damping device for installation in the frame of a structure to control vibrations while evaluating the damping property of the structure during seismic disturbances. Control means for this device include a command value judging circuit for comparing the plus or minus sign of a differential pressure value between hydraulic chambers within the device with that of a generated damping force command value to output a valve opening command value for fully opening a flow regulating valve when the signs of the command value and the differential pressure value are different from each other. A pressure controller is provided for making a correction based on the feedback of the pressure valve when the signs of the damping force command value and the differential pressure value are the same to generate a valve opening command value. A valve controller circuit is provided for making a correction by feeding back a detected valve opening value of the flow regulating valve with respect to the valve opening command value signal received from the command value judging circuit or the pressure controller to generate a valve opening control command value.

6 Claims, 8 Drawing Sheets

FIG. 4A DISPLACEMENT PRODUCED IN DEVICE

FIG. 4B VELOCITY PRODUCED IN DEVICE

FIG. 4C OPTIMUM FORCE FOR CONTROLLING VIBRATION

(PRIOR ART)

VARIABLE DAMPING DEVICE FOR SEISMIC RESPONSE CONTROLLED STRUCTURE

BACKGROUND OF THE INVENTION

1. Field of the Invention

The field of invention relates to variable damping devices for protecting a structure from vibrational disturbances by varying the rigidity of the structure and/or its natural vibrational periods.

2. Description of the Prior Art

Prior art FIGS. 9 through 12 show examples of variable damping and variable stiffness structures provided with variable damping devices connected to frames of structures. As shown in prior art FIG. 9, frame 31 comprises columns 33, beams 34, and inverted V-type braces 35. The response in terms of amplitude, velocity, and acceleration of a structure at the time of an earthquake or other vibrational disturbance is detected by a response sensor 36 installed on the structure. The sensor 36 transmits a signal to a computer 14 which analyzes the signal and sends an appropriate command to variable damping device 1 to vary the rigidity of the structure as required.

Figure 9:
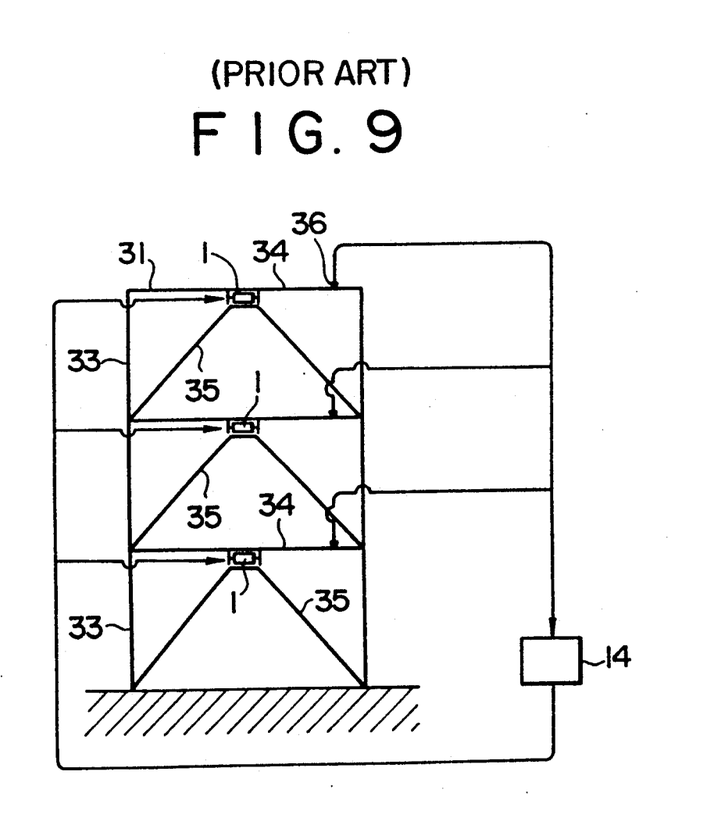
FIG. 9 is a schematic elevational view of a structure protected from seismic shock with prior art hydraulic damping devices.
Figure 10:
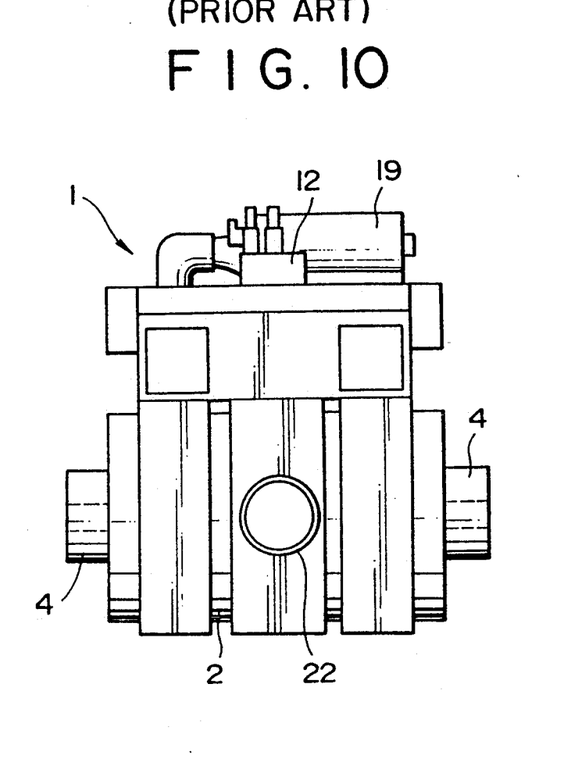
FIG. 10 is an elevational view of a prior art hydraulic damping device.
Figure 11:
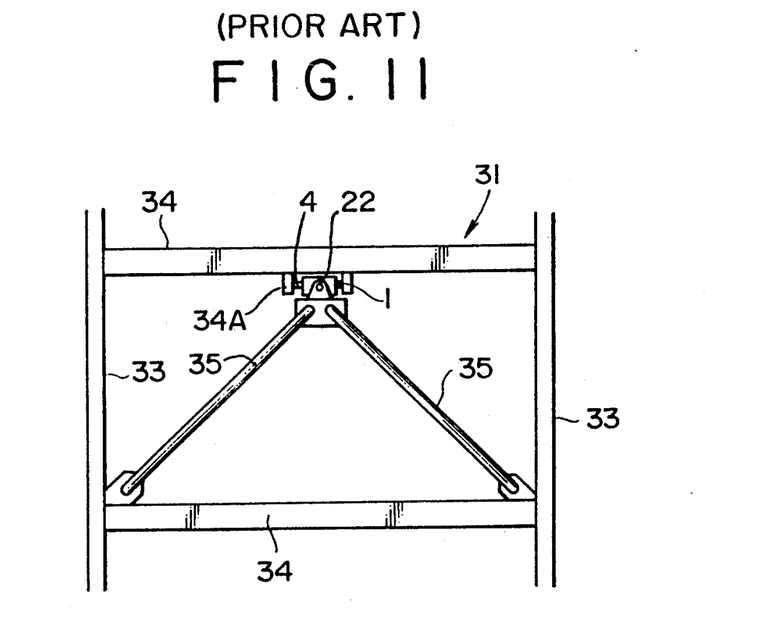
FIG. 11 is an enlarged fragmentary view of one of the prior art hydraulic damping devices shown in FIG. 9.

This prior art variable damping device 1 is also shown in FIG. 10 to include a piston rod 4, a hydraulic cylinder 2, a flow regulating valve 12, and a hydraulic accumulator 19, having a predetermined capacity, in close proximity to the flow regulating valve 12. As shown in FIG. 11, a bearing shaft 22 and both ends of the piston rod 4 are connected to a bracket 34A installed on the beam 34 and to braces 35.

Figure 12:
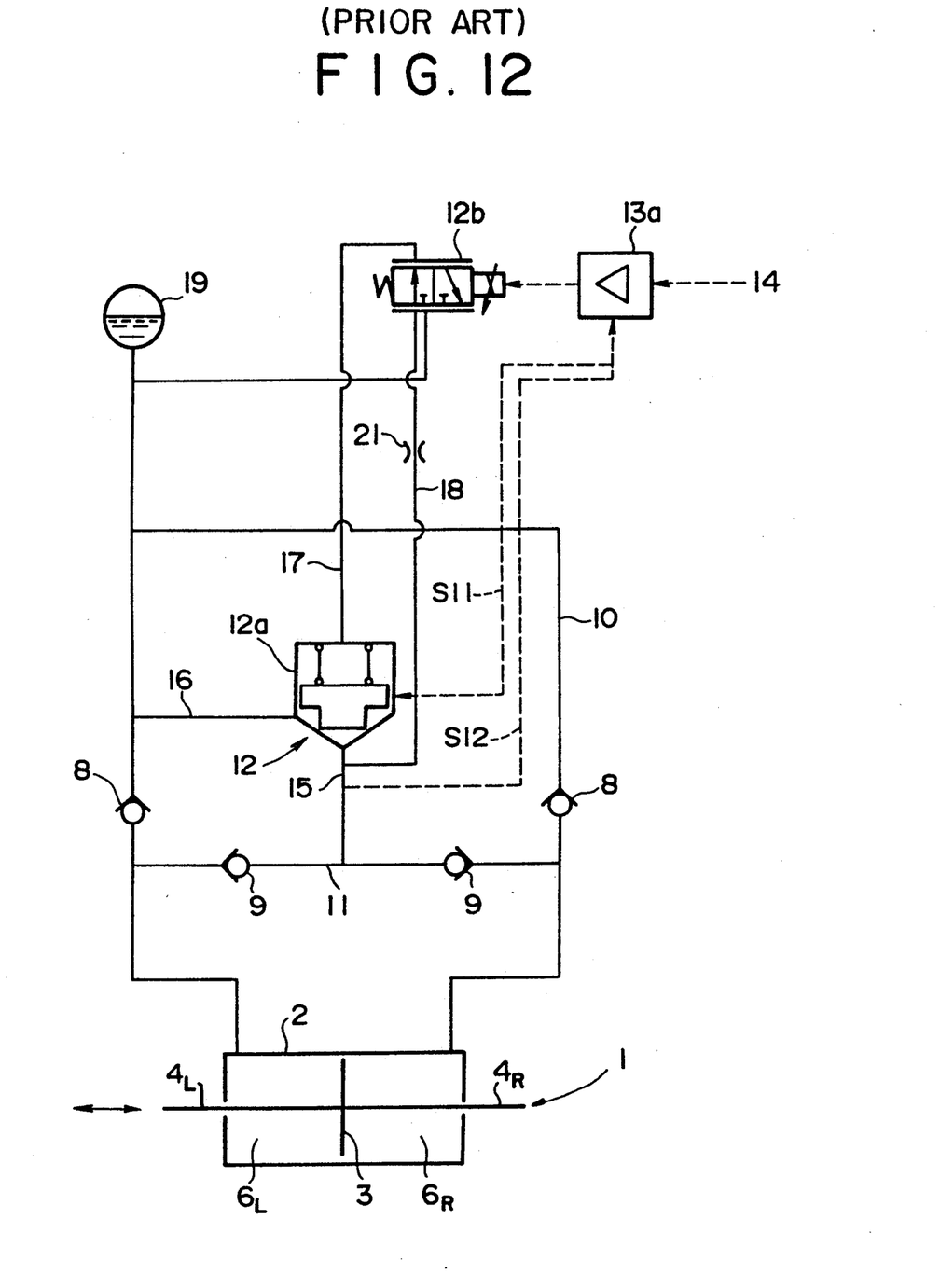
FIG. 12 is a schematic diagram of a prior art hydraulic damping device similar to the device shown in FIG. 1.

FIG. 12 is a schematic diagram of a hydraulic circuit for the prior art damping device 1, showing hydraulic chambers 6L and 6R installed to the left and right sides of a piston 3 with a piston rod 4 reciprocating within the hydraulic cylinder 2. The piston 3 is fixed or made movable to the right or left by stopping or flowing the hydraulic oil within these left and right hydraulic chambers 6 by a flow regulating valve 12. Flow regulating valve 12 selectively interconnects hydraulic chambers 6L and 6R. The operation of the flow regulating valve 12 is finely adjusted to provide various damping coefficients best suited to attenuate the seismic vibrations impacting on a structure, as more fully disclosed in U.S. Pat. Nos. 5,036,633, 5,065,552, and 5,147,018.

In variable damping devices of the above-described hydraulic types, however, it is difficult to obtain desired damping properties due to the oil temperature, the oil passage resistance, and various other factors. Seismic vibrations, as an object of the variable damping device, are unpredictable, resulting in complicated responses by the structure. As a consequence, small errors in control or design will greatly influence the damper control response to seismic vibrations. Therefore, there is need for a seismic control damping device which is not detrimentally influenced by oil temperature, oil leaks, oil line resistance, and the like.

SUMMARY OF THE INVENTION

The main body of a variable damping device of the present invention includes hydraulic chambers installed on both sides of a piston drivingly connected to a piston rod for reciprocation within a hydraulic cylinder in which the piston can be fixed or made movable to the right or to the left by stopping or flowing the hydraulic oil within these right and left hydraulic chambers by means of a valve. One end of the piston rod is connected to the frame of the structure, and the other end of the piston rod is connected to a variable stiffness portion of the structure.

A flow regulating valve is inserted in an appropriate oil passage for interconnecting left and right hydraulic chambers. The opening of the flow regulating valve is controlled by use of control means including a computer and a circuit. By varying the opening of the flow regulating valve in accordance with the response from the structure due to a seismic or similar disturbance, the damping coefficient of the variable damping device and the damping force generated can be adjusted. The safety of the structure can be secured by controlling the magnitude of the damping force so that the response of the structure can be controlled.

The control means described above mainly comprises damping force judging means composed of a computer or the like for judging a damping force to be generated by the device on the basis of the response of the structure and for generating the value corresponding to the damping force as a generated damping force command value S1, and a damping force controller for correcting the generated damping force command value S1 according to the conditions of the device and for generating a valve opening control command value S4 to operating means of the flow regulating valve in a form of control current or the like.

The damping force controller comprises a command value judging circuit, a pressure controller, and a valve opening controller as a circuit, respectively. With respect to the damping force controller, there are attached measuring means such as a sensor (displacement gauge or the like) as valve opening detection means for detecting the actual opening of the flow regulating valve and another sensor (pressure intensifier or the like) as pressure detection means for detecting the hydraulic pressure in both hydraulic chambers in the main body of the device.

The detected hydraulic values S6 and S7 corresponding to the hydraulic pressure in each hydraulic chamber are generated from the pressure detection means in both hydraulic chambers and a differential pressure value S8 can be obtained in a subtraction circuit.

The generated damping force command value S1, which is forwarded from the damping force judging means of a computer or the like, as well as that of the differential pressure value S8, are judged in the command value judging circuit of the damping force controller. When the signs are the same, the value corresponding to the generated damping force command value S1 is directed as a pressure command value S2 to the pressure controller. Where the signs differ, the value corresponding to the value when the flow regulating valve is fully opened is directed as a valve opening value S3 to the valve opening controller. Then, in the pressure controller, the differential pressure value S8 described above is fed back with respect to the pressure command value S2 forwarded from the command value judging circuit to generate a valve opening command value S3 corresponding to the correction value. In the valve opening controller, the detected valve opening value S5 corresponding to the actual opening of the flow regulating valve and forwarded from the valve opening detection means described above is fed back with respect to the valve opening command value S3, and a valve opening control command value S4 corresponding to the correction value is generated to the operating means of the flow regulating valve.

The damping force of the variable damping device can be generated only in the direction where the differential pressure between the left and right cylinder chambers is generated and cannot be generated in a reversed direction thereof. Consequently, the sign of the command value S1 and that of the differential pressure value S8 are judged in the command value judging circuit. Only when the device can generate the damping force of the command value is a pressure corresponding to the damping force commanded to the pressure controller.

The stability of the device is increased by combining the valve opening controller with the pressure controller. With this combination, the temperature can cause to variation in the functioning of the device.

By use of such damping force controller composed of the command value judging circuit, the pressure controller and the valve opening controller, the device can be utilized as a device for generating any damping forces only by the input of any desired generated damping force in a form of voltage or the like without taking any consideration of the operating conditions of the device as if the device were an actuator. That is, when the device is installed in the vibrating structure as shown in FIG. 4 and in the case where the input vibration is expressed in a sine wave, the optimum force to be generated by the device so as to control the vibration of the structure is approximately in proportion to the rate generated in the device and the substantial time expression of this force can be made by the damping force of the device.

As described above, because of the combination of the controller with the device, a similar effect can be obtained by the utilized method similar to that in the case of using the hydraulic actuator, and necessary energy for the device can be limited to the power source for the controller, which may be minimal.

OBJECTS OF THE INVENTION

It is therefore among the objects of the present invention to provide a variable damping device that reliably operates under various conditions of vibrational disturbances.

It is another object of the invention to provide a variable damping device that can efficiently control the response of the structure to seismic vibration and provide stability in the structure.

It is another object of the invention to provide a variable damping device in which the optimum damping force to be generated is judged on the basis of the response of the structure, wherein there is no need to incorporate the operating conditions of the variable damping device into the judging means.

It is still another object of the present invention to provide a variable damping device in which a damping force controller is added to the control means of the device, so that the computer judges the damping force to be generated and provides a control force similar to that in the case of using drive means, such as an actuator.

It is yet another object of the invention to provide a variable damping device in which it is possible to generate a vibrational control force equal to that provided by drive means such as an actuator with a minimal amount of energy.

It is still another object of the invention to provide a variable damping device in which there is no variation in the characteristics of the device due to changes in temperature of the hydraulic fluid.

It is yet another object of the invention to provide a variable damping device in which the generated damping force against vibrational disturbances can be varied by applying it to different variable damping and stiffness structures, thereby providing optimum damping property corresponding to the characteristics of the individual structure.

BRIEF DESCRIPTION OF THE DRAWINGS

The foregoing and other objects and advantages of the invention will be apparent from the following description of preferred embodiments of the invention with reference to the accompanying drawings, in which.

DETAILED DESCRIPTION OF THE PREFERRED EMBODIMENTS

Figure 1:
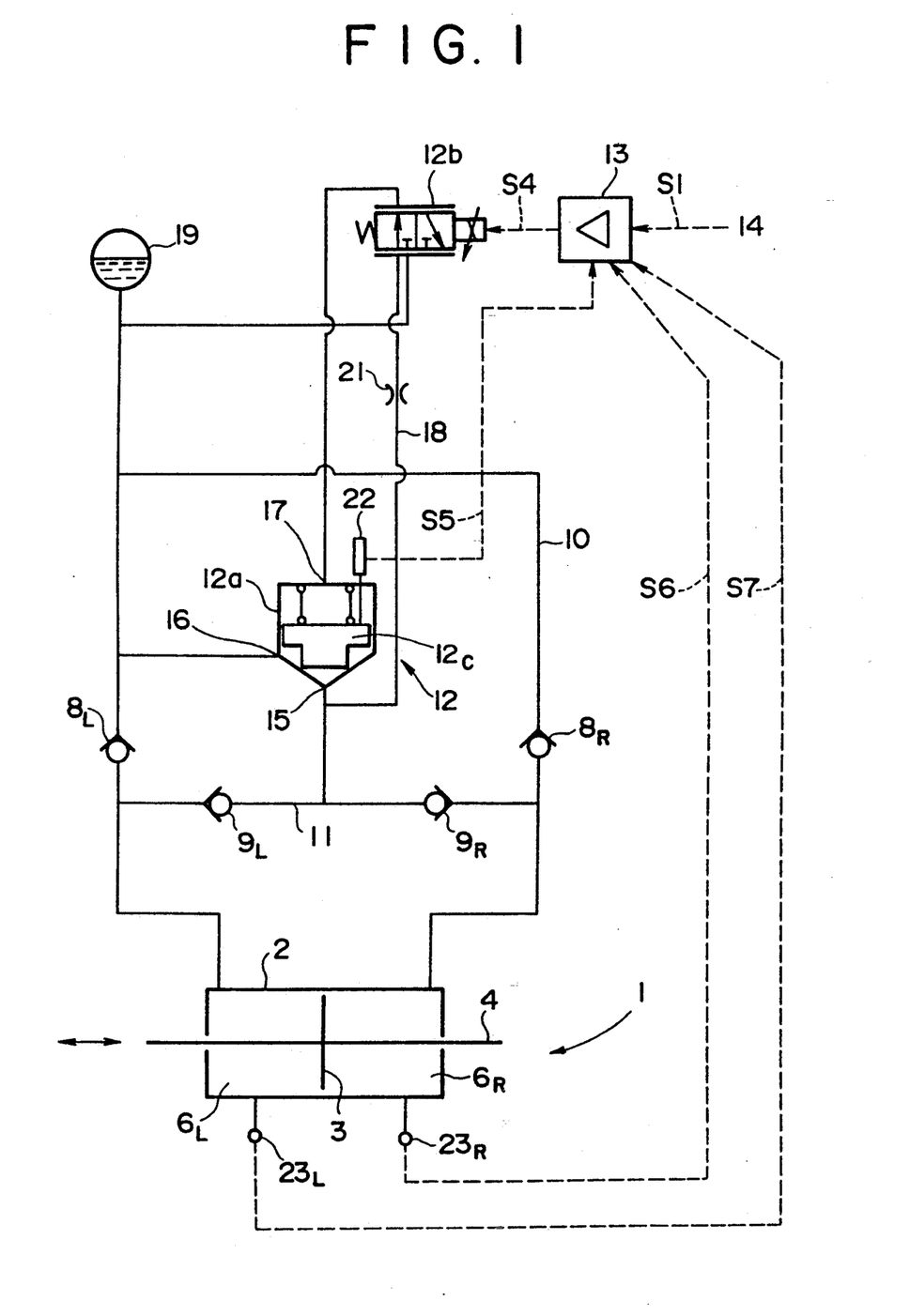
FIG. 1 is a schematic hydraulic circuit diagram showing a variable damping device as a preferred embodiment of the present invention.

As shown in FIG. 1, the main cylinder body 2 of the variable damping device 1 is designed to slidably house a double-acting piston 3 which reciprocates through a piston rod 4 slidably projecting through ends 2L and 2R of the cylinder body 2. Hydraulic chambers 6L and 6R, formed on the left and right sides of the piston 3, respectively, are provided with outflow preventing check valves 8L and 8R for preventing the outflow of hydraulic oil from the hydraulic chambers 6L and 6R and inflow preventing check valves 9L and 9R for preventing the inflow of the hydraulic oil into the hydraulic chambers 6L and 6R.

An inflow passage 10 for connecting the left and right outflow preventing check valves 8 with each other and an outflow passage 11 for connecting the left and right inflow preventing check valves 9 with each other are provided and can cause the left and right hydraulic chambers 6 to communicate with each other by connecting these passages with each other through a flow regulating valve 12.

In the embodiment of the invention shown in FIG. 1, the flow regulating valve 12 comprises a large flow directional control valve 12a and a shut-off valve 12b. An inlet port 15 and an outlet port 16 are provided at one end of the large flow directional control valve 12a and a back pressure port 17 is provided at the other end. The shut-off valve 12b connects by-pass passage 18 to back pressure port 17 and to inlet port 15.

An accumulator 19 communicating with the inflow passage 10 is attached to the cylinder 2. This accumulator 19 is an oil reservoir which pressurizes the hydraulic oil in the cylinder 2, supplies make-up oil in the event of a leak, prevents the intrusion of air bubbles, compresses oil, and provides for volumetric variations due to temperature changes in the oil.

The large flow directional control valve 12a is also provided with a valve opening sensor 22 for detecting the position of the valve body 12c, and the sensed position of the valve body 12c is relayed to a damping force controller 13 as a detected valve opening value S5.

Hydraulic chambers 6L and 6R in the cylinder 2 are provided with oil pressure indicators 23L and 23R, respectively, which forward detected hydraulic pressure values S6 and S7 to the damping force controller 13. The differential pressure value S8 between the detected hydraulic pressure values S6 and S7 corresponds to the damping force actually generated by the variable damping device 1.

Figure 2:
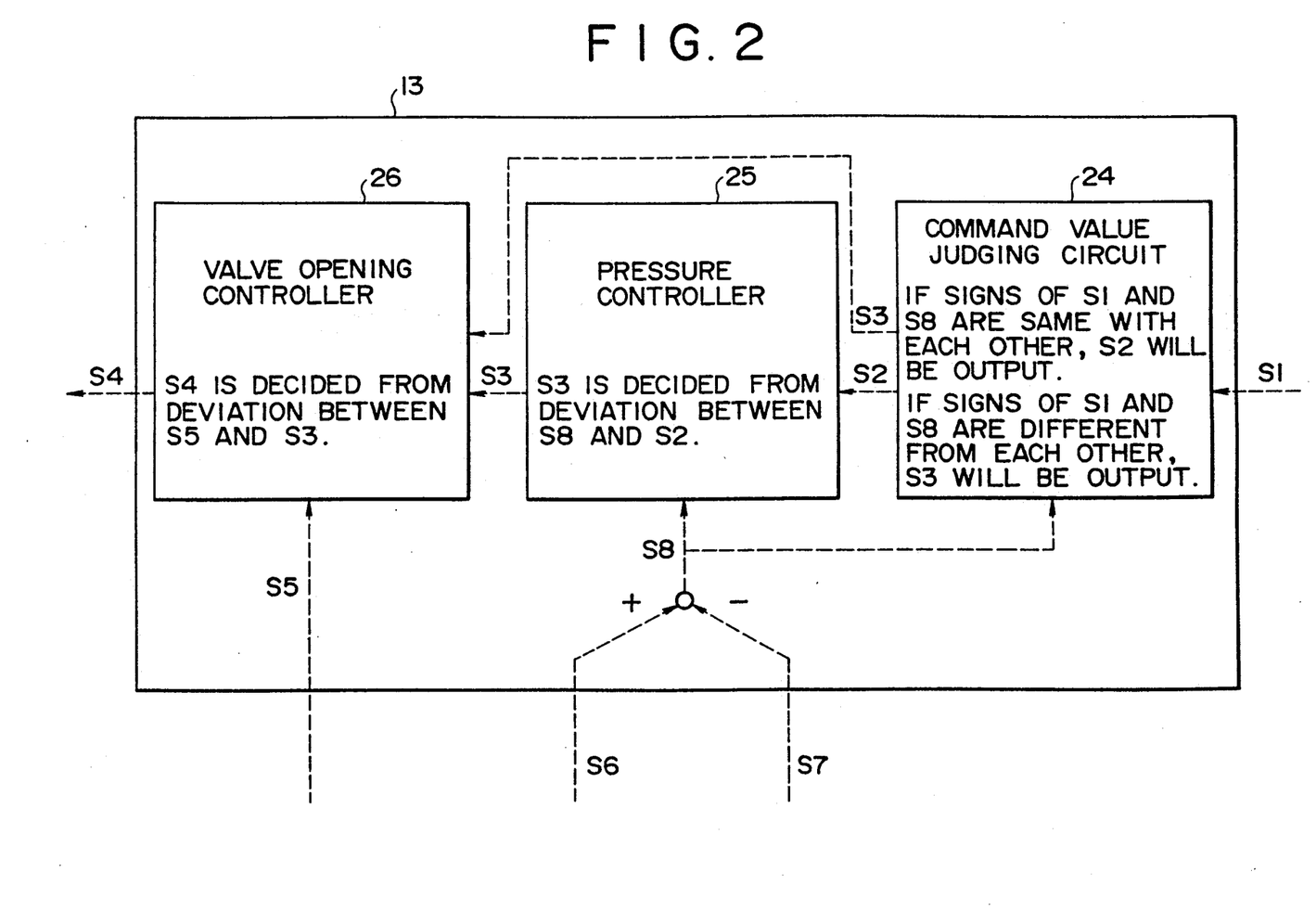
FIG. 2 is a partial block diagram showing a damping force controller utilized in the variable damping device of the present invention.

FIG. 2 is a block diagram showing the constitution of a portion of the damping force controller 13. The damping force controller 13 includes a command value judging circuit 24, a pressure controller 25 and a valve opening controller 26. In the command value judging circuit 24, the sign of the generated damping force command value S1 forwarded from the damping force judging means, such as a computer (see FIG. 9) and that of the differential pressure value S8 obtained from the detected hydraulic pressure values S6 and S7 are compared. If the signs are the same, the value corresponding to the generated damping force command value S1 is put out as a pressure command value S2 to the pressure controller 25. If the signs are different, the value corresponding to the value when the opening of the flow regulating valve 12 becomes fully opened is generated as a valve opening command value S3 to the valve opening controller 26. Then, in the pressure controller 25, the differential pressure value S8 is fed back with respect to the pressure command value S2 forwarded from the command value judging circuit 24 to output the valve opening command value S3. Furthermore, in the valve opening controller 26, a detected valve opening value S5, corresponding to the actual opening of the flow regulating valve 12, and forwarded from the valve opening sensor 22, is fed back with respect to the valve opening control command value S4 to regulate the opening of the flow regulating valve 12. The optimum damping force for controlling the vibration of a structure is generated in the main body of the device by regulating the opening of the flow regulating valve 12.

Figure 3:
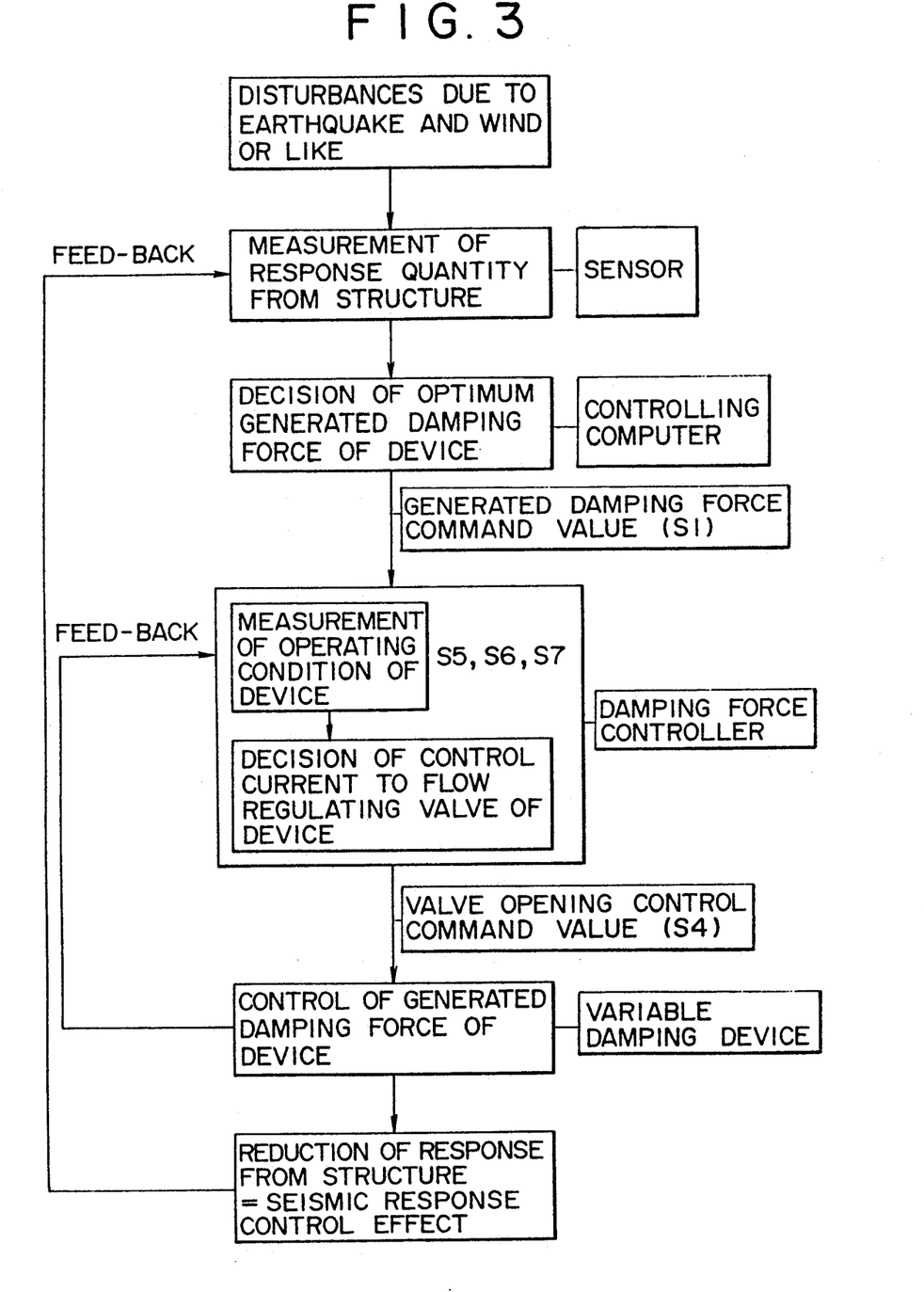
FIG. 3 is a flow chart showing a vibration control for a structure utilizing the variable damping device of the present invention.

FIG. 3 is a flow chart showing the vibration control of a structure according to the variable damping device of the present invention. With reference to the controlling computer, for example, such a method is adopted that the relations between the response characteristics of the structure and the damping coefficient or damping force are examined at each vibrational level and the optimum generated damping force is obtained by a computer on the basis of the above-described relations.

Figure 4A:
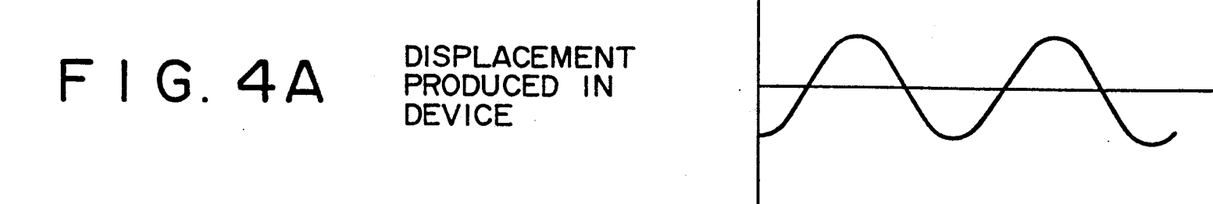
FIG. 4A is a curve showing displacement produced in the inventive device during a seismic disturbance.
Figure 4B:
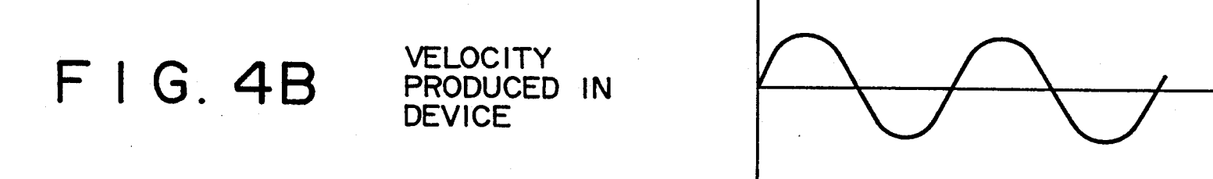
FIG. 4B is a curve showing the velocity produced in the inventive device during a seismic disturbance.
Figure 4C:
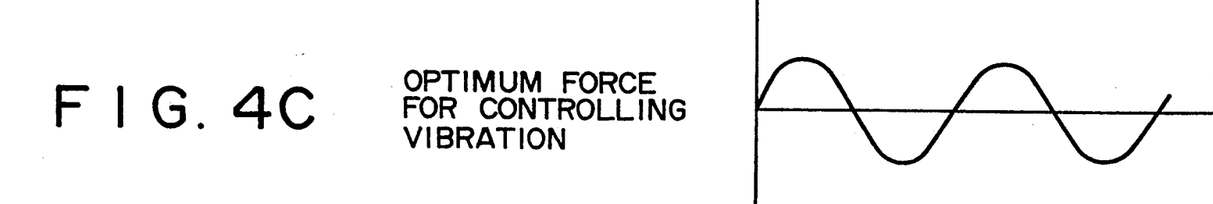
FIG. 4C is a curve showing the optimum force produced by the inventive device for controlling vibration caused by a seismic disturbance.

FIG. 4 comprises the curves shown in FIGS. 4A, 4B, and 4C. FIG. 4A plots a sine curve showing displacement produced in the inventive damping device 1 caused by a seismic disturbance. FIG. 4B plots a curve illustrating the sinusoidal velocity produced in the inventive damping device 1 during the seismic disturbance plotted in FIG. 4A. FIG. 4C plots a curve showing the sinusoidal characteristic of the optimum force required of the inventive damping device 1 to control vibration in a structure caused by the seismic disturbance referred to with respect to the curves of FIGS. 4A and 4B.

Figure 5:
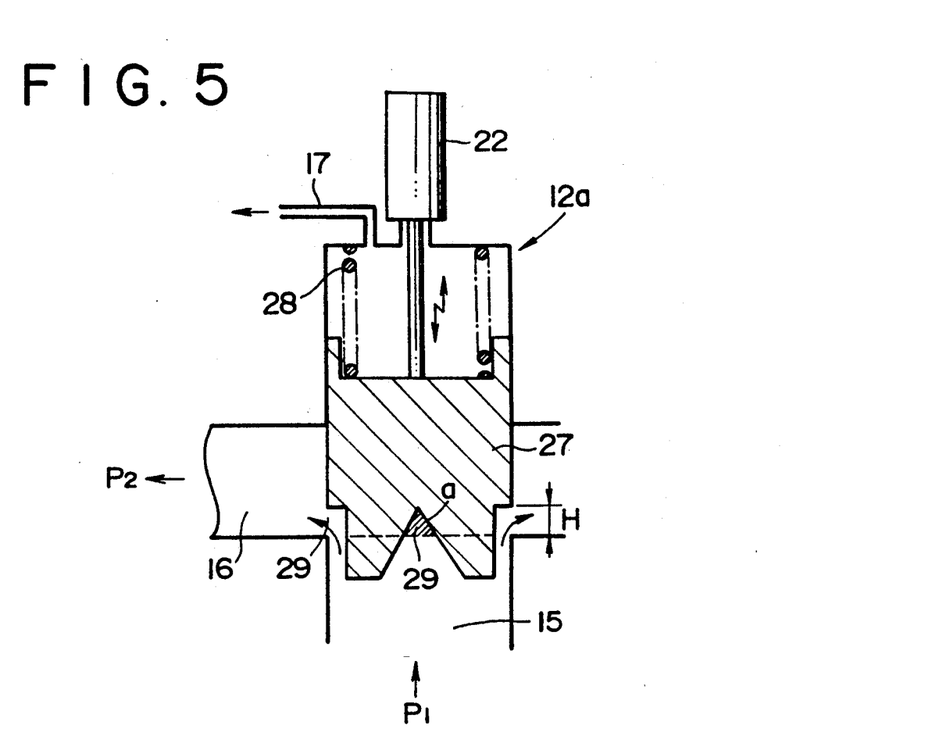
FIG. 5 is an enlarged, partially sectioned, elevational view of the valve 12a of FIG. 1, shown in the open position.

FIG. 5 shows an embodiment of the large flow directional control valve 12a of the flow regulating valve 12 used in the variable damping device of the present invention. In the FIGURE, 27 indicates a spool valve and 28 indicates a spring for supporting the spool valve 27. The position of the spool valve 27 is determined depending on the balance among a back pressure P2 of the spool 27, a spring force of the spring 28, and a front pressure P1.

An initial flexibility quantity and a spring constant of the spring 28 relate to a force for pushing the spool 27 upward, that is, a cracking pressure force needed for the spool 27 to initially open. In case the required force is too large, considerable front pressure P1 is needed for the spool 27 to initially open and a large load is also needed for the variable damping device to become actuated. In other words, the invention will not function as a variable damping device below a minimum load. However, the overall responses of the device can be improved and the controllable range can also be expanded by optimum control of the initial flexibility quantity and the spring constant of the spring 28.

Figure 6:
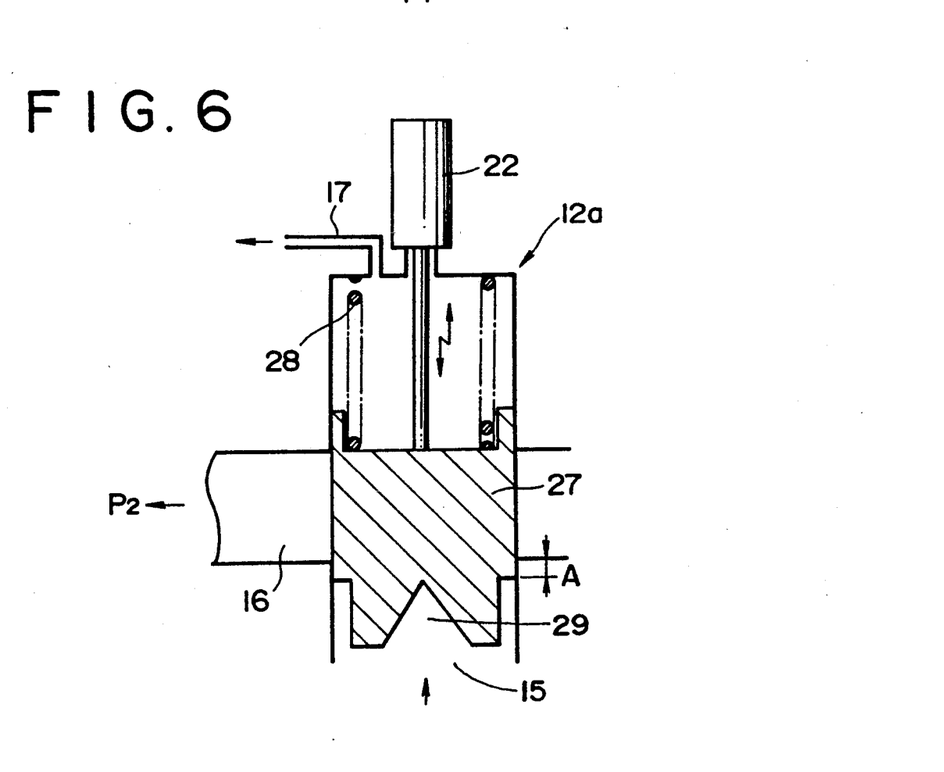
FIG. 6 is an enlarged, partially sectioned, elevational view of the valve 12a of FIG. 1, shown in the closed position.
Figure 7:
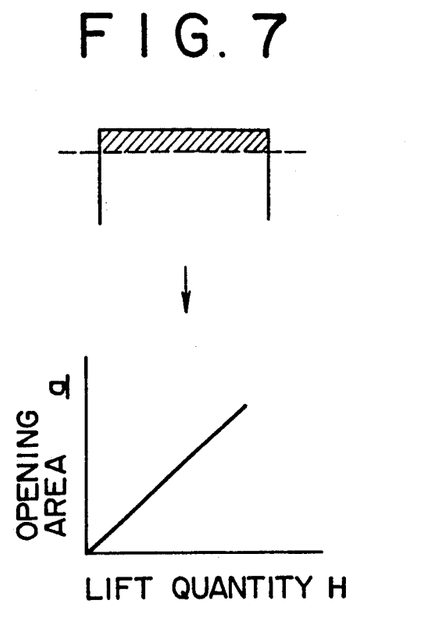
FIG. 7 is a graph plotting valve lifting thrust against rectangular cross-sectional valve opening areas.
Figure 8:
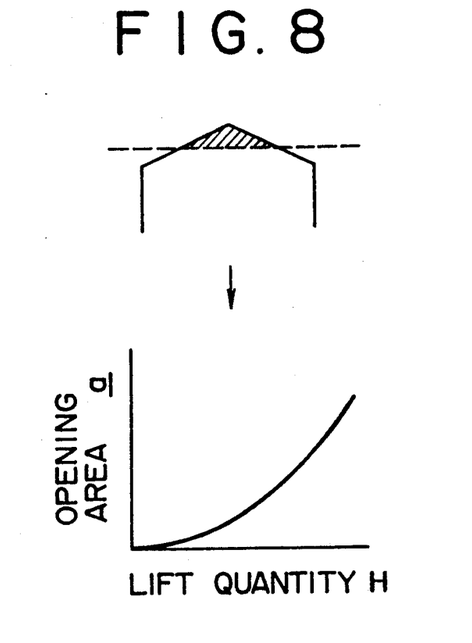
FIG. 8 is a graph plotting valve lifting thrust against triangular cross-sectional valve opening areas.

Furthermore, adjustment of the overlap distance A (see FIG. 6) between the outlet port 16 and the spool 27 in a closed and consequently hydraulically locked condition is one of the means for improving valve response time. If the overlap distance A is increased, the corresponding response is slowed, thereby prolonging the time when the inlet port 15 and the outlet port 16 are in the locked condition. If the overlap distance A is eliminated, the response time is correspondingly improved, but the space between the inlet port 15 and the outlet port 16, as a practical matter, cannot be kept in a completely locked condition. Therefore, the response condition are obtained by bringing the overlap distance A as close to zero as possible. In order to finely control the transition of the valve 12a from completely locked to completely open, the cross-sectional shape and area of the slot 29 (see FIG. 5) contributes to the rate of opening and closing of the valve. Although triangular, circular, and elliptical shapes provide different rates of valve performance, it has been found that a triangular shape prevents an abrupt increase, i.e., surge, from zero to full flow. Thus, the triangular shape 29 shown in FIGS. 5 and 6 has been adopted as the preferred embodiment of the invention. The graphs of FIGS. 7 and 8 plot the lift quantity H against opening area a for rectangular and triangular slots 29.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

What is claimed is:

1. In a variable damping device for a seismic response controlled structure, said variable damping device having a piston slidably mounted in
 a hydraulic cylinder and said piston being adapted to reciprocate therein, said cylinder being connected to said frame main body or to one of the said variable stiffness elements;
 said piston being connected to one of said variable stiffness elements or to said frame main body;
 hydraulic chambers in said hydraulic cylinder being provided on opposite sides of said piston;
 a flow passage for interconnecting said hydraulic chambers with each other; and
 a flow regulating valve provided on said flow passage; the improvement comprising:
 control means for controlling the opening of said flow regulating valve, said control means including
 damping force judging means for judging a damping force to be generated by said device on the basis of the responses of said structure by the vibrational and external force and for generating the value corresponding to said damping force as a generated damping force command value S1;
 valve opening detection means for detecting the opening of said flow regulating valve and for generating the value corresponding to said opening as a detected valve opening value S5;
 pressure detection means for detecting the hydraulic pressure of said both hydraulic chambers and for generating the value corresponding to said hydraulic pressure as detected hydraulic pressure values S6 and S7, respectively;
 a subtraction circuit for generating the value corresponding to the difference between said both detected hydraulic pressure values S6 and S7 as a differential pressure value S8;
 a command value judging circuit for judging the sign of said generated damping force command value S1 and that of said differential pressure value S8 and for generating the value corresponding to said generated damping force command value S1 as a pressure command value S2 when said signs are the same, while generating the value corresponding to the value where the opening of said flow regulating valve is fully opened as a valve opening command value S3 when said signs are different;
 a pressure controller circuit for feeding back said differential pressure value S8 with respect to said pressure command value S2 to make a correction and for generating the valve opening command value S3 corresponding to the correction value;
 a valve opening controller circuit for feeding back said detected valve opening value S5 with respect to said valve opening command value S3 to make a correction and for generating the valve opening control command value S4 corresponding to the correction value; and
 operating means for actuating said flow regulating valve on the basis of said valve opening control command value S4.

2. A variable damping device for a seismic response controlled structure according to claim 1, wherein said flow regulating valve includes a large flow directional control valve having an inlet port and an outlet port at one end side of a valve body and having a back pressure port at the other end side thereof and a shut-off valve capable of controlling the outflow of hydraulic oil to said back pressure port, and said flow regulating valve is constituted such that the pressure of the hydraulic oil on the back pressure port side of said large flow directional control valve is regulated by controlling the opening and closing operation of said shut-off valve so as to be able to regulate in accordance with the damping coefficient or generated damping force of a device required for the opening of the large flow directional control valve.

3. In a variable damping device for a seismic response controlled structure, said structure having a frame main body and a variable stiffness elements to brace said frame main body, said variable damping device having a piston slidably mounted in
 a hydraulic cylinder, said piston being adapted to reciprocate therein, said cylinder being connected to said frame main body or to one of the variable stiffness elements;
 said piston being connected to one of said variable stiffness elements or to said frame main body;
 hydraulic chambers in said hydraulic cylinder being provided on opposite sides of said piston;
 a pair of outflow preventing check valves for preventing the outflow of hydraulic oil from said both hydraulic chambers;
 a pair of inflow preventing check valves for preventing the inflow of the hydraulic oil into said both hydraulic chambers;
 an inflow passage for connecting said both outflow preventing check valves with each other;
 an outflow passage for connecting said both inflow preventing check valves with each other; and
 a flow regulating valve provided on the connection position between said inflow passage and said outflow passage; the improvement comprising:
 control means for controlling the opening of said flow regulating valve, said control means including
 damping force judging means for judging a damping force to be generated by said device on the basis of the responses of said structure by the vibrational and external force and for generating the value corresponding to said damping force as a generated damping force command value S1;
 valve opening detection means for detecting the opening of said flow regulating valve and for generating the value corresponding to said opening as a detected valve opening value S5;
 pressure detection means for detecting the hydraulic pressure of said both hydraulic chambers and for the value corresponding to said hydraulic pressure as detected hydraulic pressure values S6 and S7, respectively;
 a subtraction circuit for generating the value corresponding to the difference between said both detected hydraulic pressure values S6 and S7 as a differential pressure value S8;

command value judging circuit for judging the sign of said generated damping force command value S1 and that of said differential pressure value S8 and for generating the value corresponding to said generated damping force command value S1 as a pressure command value S2 when said signs are the same, while generating the value corresponding to the value where the opening of said flow regulating valve is fully opened as a valve opening command value S3 when said signs are different;

a pressure controller circuit for feeding back said differential pressure value S8 with respect to said pressure command value S2 to make a correction and for generating the valve opening command value S3 corresponding to the correction value;

a valve opening condition circuit for feeding back said detected valve opening value S5 with respect to said valve opening command value S4 to make a correction and for generating the valve opening control command value S4 corresponding to the correction value; and operating means for actuating said flow regulating valve on the basis of said valve opening control command value S4.

4. A variable damping device for a seismic response controlled structure according to claim 3, wherein said flow regulating valve includes a large flow directional control valve having an inlet port and an outlet port at one end side of a valve body and having a back pressure port at the other end side thereof and a shut-off valve capable of controlling the outflow of hydraulic oil to said back pressure port, and said flow regulating valve is constituted such that the pressure of the hydraulic oil on the back pressure port side of said large flow directional control valve is regulated by controlling the opening and closing operation of said shut-off valve so as to be able to regulate in accordance with the damping coefficient or generated damping force of a device required for the opening of the large flow directional control valve.

5. In a variable damping device for a seismic response controlled structure having a frame and variable stiffness members, including a hydraulic cylinder with opposite end portions; a piston slidably placed in said hydraulic cylinder to form first and second hydraulic chambers on opposite sides of said piston; said hydraulic cylinder being connected to said frame or to one of the variable stiffness members; said piston being connected to one of said variable stiffness members or to said frame; a hydraulic flow passage for interconnecting said first and second hydraulic chambers; and a flow regulating valve provided in association with said hydraulic flow passage, the improvement comprising:

control means for controlling the functioning of said flow regulating valve, said control means including seismic force measuring means for determining the magnitude of the responsive damping force to be applied by said damping device to said structure, said seismic force measuring means including means to generating a first signal representing said damping force, flow regulating valve opening detection means for detecting the opening of said flow regulating valve and for generating a second signal proportionate to said flow regulating valve opening;

pressure detection means for detecting the hydraulic pressures of said first and second hydraulic chambers and for generating third and fourth signals proportionate to said detected hydraulic pressures;

a subtraction circuit for generating a fifth signal representing the difference between said third and fourth signals;

circuit means for determining the sign of said first generated signal and that of said fifth signal and for transmitting said first signal as a valve controlling pressure command when the signs of said first and fifth signals are the same, and for transmitting a sixth signal as a valve opening command when the signs of said first and fifth signal are opposed;

a pressure controller circuit for feeding back said differential pressure fifth signal responsive to said second signal pressure command to adjust and to transmit said sixth signal valve opening command;

a valve opening controller circuit for generating and feeding back a detected valve opening seventh signal responsive to said sixth signal for correcting and for generating a valve opening control command eighth signal; and means for actuating said flow regulating valve responsive to said eighth signal.

6. The variable damping device of claim 5, wherein said flow regulating valve includes an inlet port, an outlet port, a back pressure port, a shut-off valve for controlling the outflow of hydraulic oil to said back pressure port, and means to regulate the hydraulic pressure at said back pressure port by controlling the opening and closing of said shut-off valve responsive to said magnitude of said damping force.

* * * * *